Aug. 13, 1946.   L. S. WILLIAMS   2,405,626
COUNTING MECHANISM
Filed Oct. 24, 1942   5 Sheets-Sheet 1
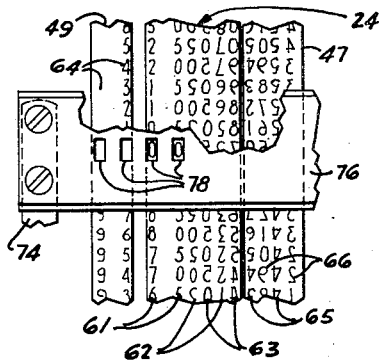
Fig. IV
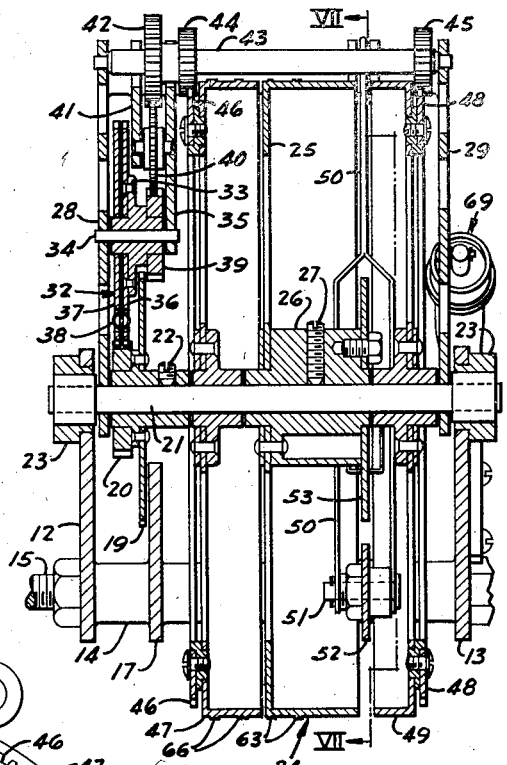
Fig. II
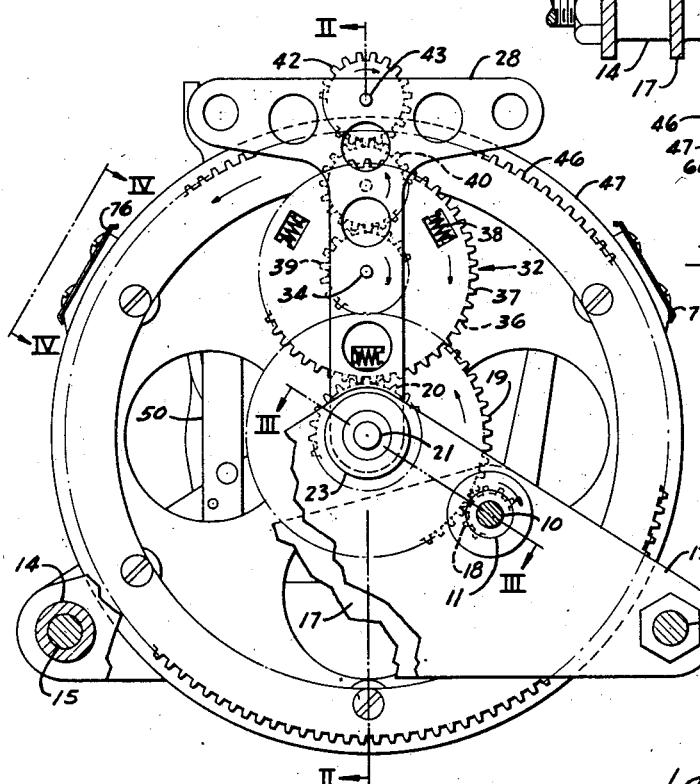
Fig. I
Lawrence S. Williams
INVENTOR
BY Marshall & Marshall
ATTORNEYS Aug. 13, 1946.    L. S. WILLIAMS    2,405,626
COUNTING MECHANISM
Filed Oct. 24, 1942    5 Sheets-Sheet 2
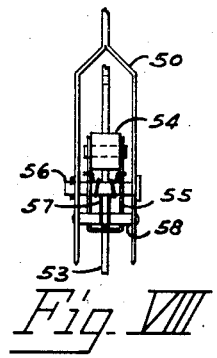
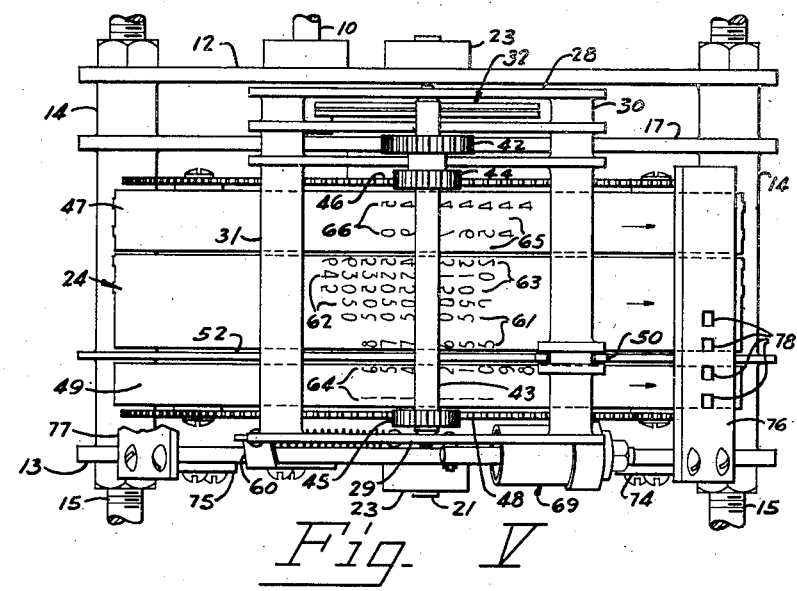
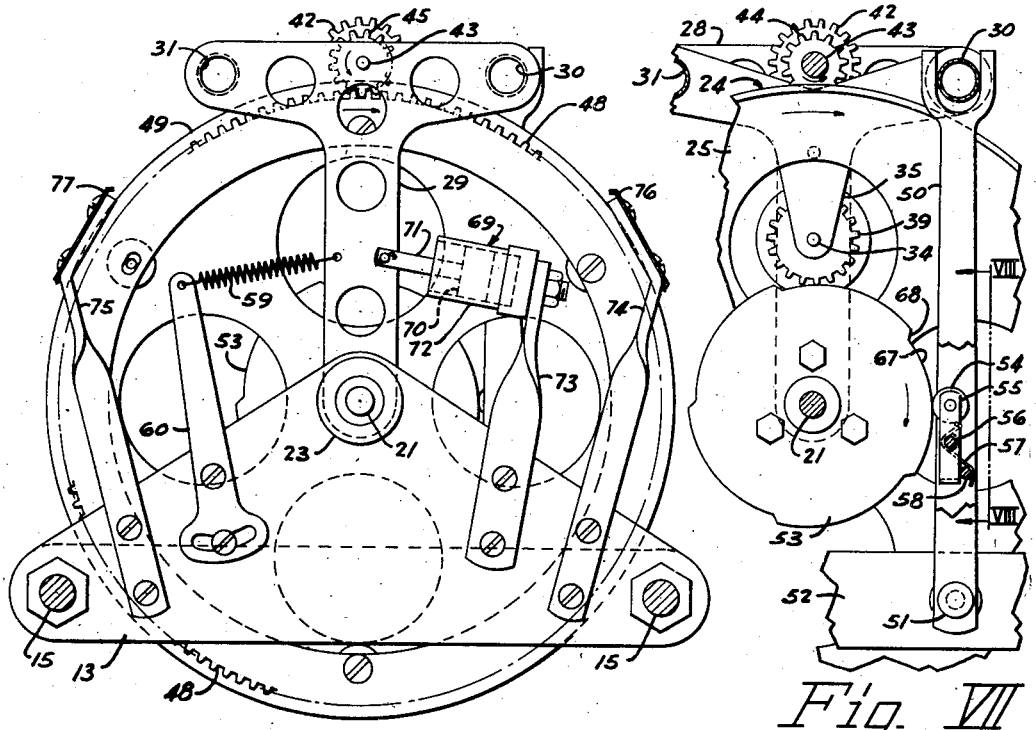
Lawrence S. Williams
INVENTOR
BY Marshall & Marshall
ATTORNEYS Aug. 13, 1946.   L. S. WILLIAMS   2,405,626
COUNTING MECHANISM
Filed Oct. 24, 1942   5 Sheets-Sheet 3
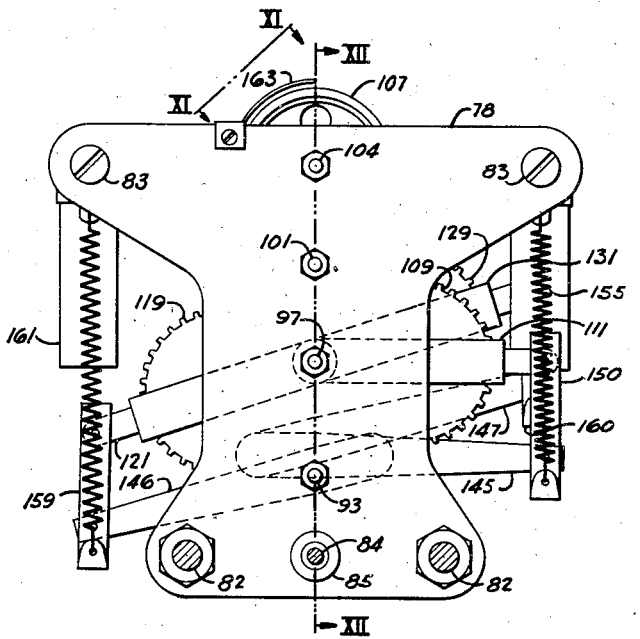
Fig. X
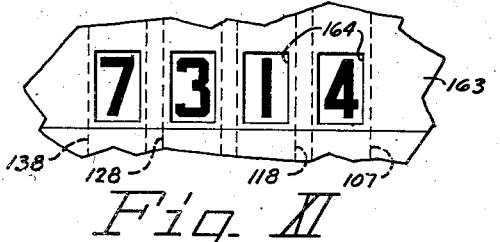
Fig. XI
Fig. IX
Lawrence S. Williams
INVENTOR
BY Marshall & Marshall
ATTORNEYS Aug. 13, 1946.  L. S. WILLIAMS  2,405,626
COUNTING MECHANISM
Filed Oct. 24, 1942  5 Sheets-Sheet 4
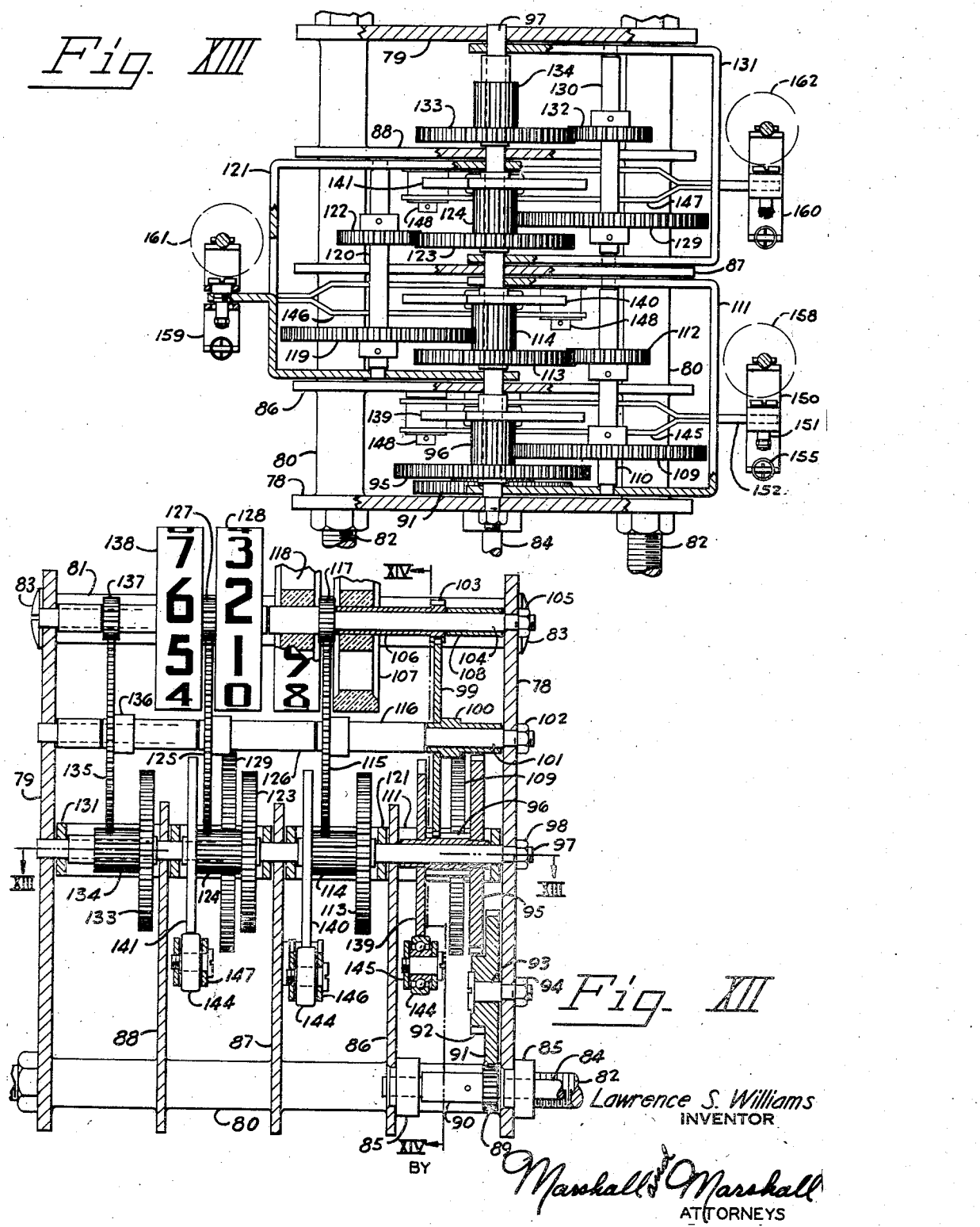
Lawrence S. Williams
INVENTOR
BY Marshall & Marshall
ATTORNEYS

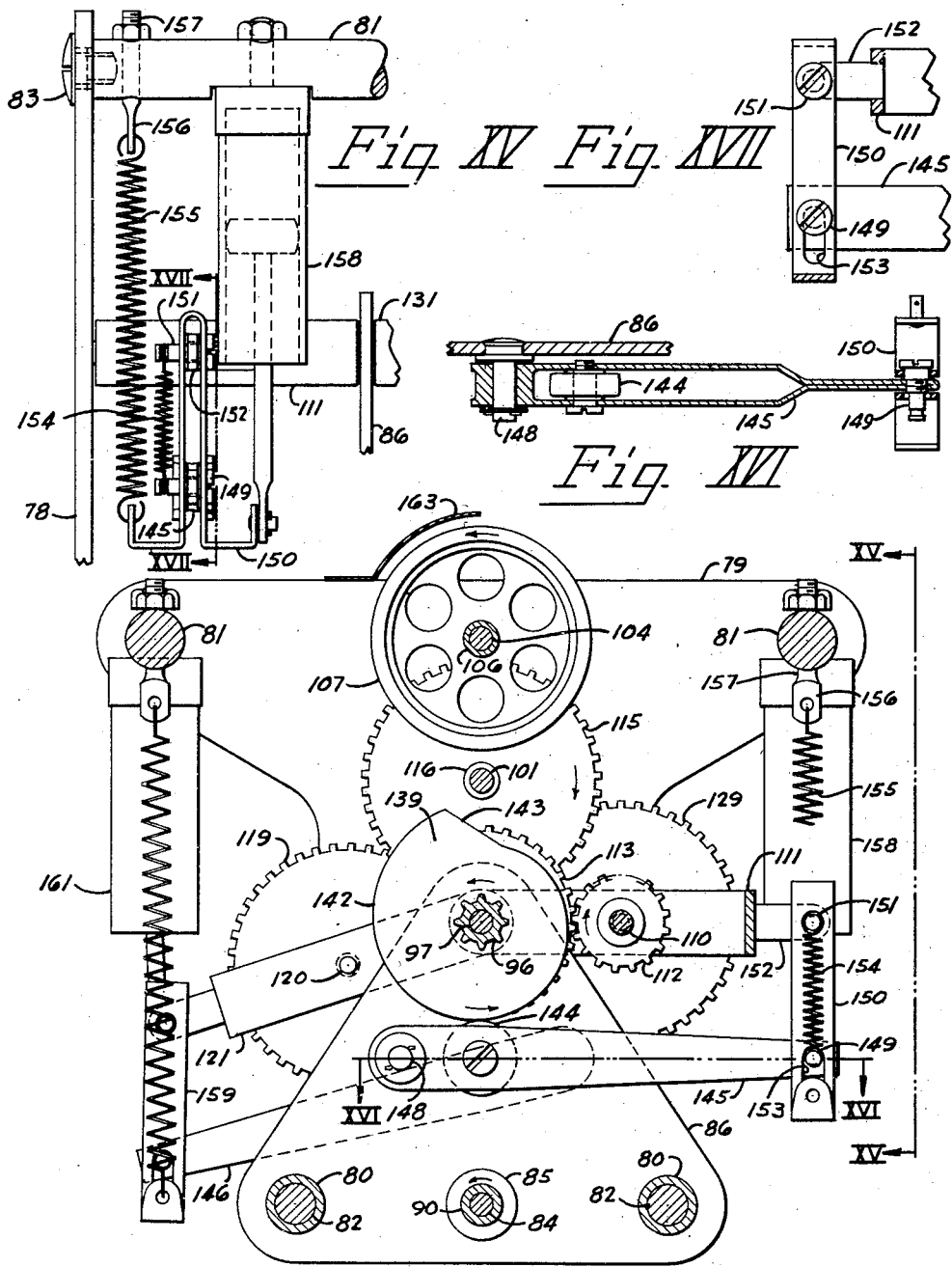

Patented Aug. 13, 1946

2,405,626

UNITED STATES PATENT OFFICE 2,405,626

COUNTING MECHANISM

Lawrence S. Williams, Toledo, Ohio, assignor to Toledo Scale Company, Toledo, Ohio, a corporation of New Jersey Application October 24, 1942, Serial No. 463,264

10 Claims. (Cl. 235—136)

This invention relates to counting mechanisms having drums or dials bearing figures in series of decimal places, such as units, tens and hundreds.

Such counting mechanisms for the most part may be classified into two different types. One of these is the direct gear driven type of counter wherein one counting drum, for example, the units drum, is geared to the tens drum by gearing having a reduction of ten to one and the tens drum is geared to the hundreds drum by similar gearing, etc. Counters of this type have two disadvantages. If the number to be counted is, for example 555, when the mechanism stops the hundreds indicator will be halfway between the "5" and "6" positions and the tens indicator will be halfway between the "5" and "6" positions. A familiar example of this type of counting mechanism having movable pointer indicators geared together is the ordinary electric meter in reading which it is customary, whenever an indicator points to the space between two figures, always to read the larger figure, or always to read the smaller figure. This, of course, gives accurate results in the long run; but, if the wrong figure were read by mistake, the particular reading would be inaccurate. A second serious disadvantage with the gear driven counter is the fact that at even moderate speeds of operation, since the counting wheels are in constant motion, the figures cannot be read at all.

A second type of counting mechanism is the so-called "transfer" type in which the units drum only is rotated at constant speed, the tens and hundreds drums being moved intermittently. For each revolution of the units drum in this type of counter there is a "carry-over" of one increment to the tens drum, and similarly for each rotation of the tens drum a "carry-over" of one increment to the hundreds drum. This type of mechanism eliminates the difficulty in reading the tens and hundreds drums since they are moved from position to position instantly at the time of "carry-over." However, at very high speed operation, "carry-over" type counters tend to destroy themselves due to the rapidity with which the "carry-overs" are made.

Because of the low speeds at which "carry-over" type counters must be operated to prevent destructive wear, gear type counters have been used for most tasks of counting where speed of operation is more important than ease and accuracy of reading. The operating limitations, inherent in both gear driven and "carry-over" type counters, have made it impracticable to use either type of such counters in connection with instruments the speeds of operation of which vary during their cycles of operations from extremely high speeds to very slow speeds and in which indications must be positive and not liable to be erroneously read because of intermediately positioned indicators.

Weighing scales are one type of instrument which fall within this class. In a weighing scale the first and major part of the movement of the mechanism under influence of a load being weighed is very rapid, requiring indicating or counting means capable of moving from zero to nearly load indicating position in a few seconds. In addition, it is important that the indicating means be legible with the tens and hundreds figures in definite indicating position whenever the units drum is moving at slow speeds. Finally, when the weighing mechanism comes to rest its indication must be positive. In retail scales particularly it is required that the indicating mechanism be legible when in slow movement, so that merchants can "pour on" material until a desired weight is reached.

These requirements would be even more important if the weighing scale incorporated calculating mechanism which multiplied the weight of the load by a selected price per pound, because the multiplying ratio would cause the price indicating or counting mechanism to operate at a speed still higher than the speed of operation of the weight indicating mechanism.

The limitations of gear type and "carry-over" type counting mechanisms have been one of the major stumbling blocks that have hampered the development of mechanical money value calculating devices for incorporation in weighing scales.

It is an object of this invention to provide a counting mechanism which will operate at high speeds without tendency to self-destruction and yet which will exhibit centrally positioned tens and hundreds figures when operating at slow speed or at the end of the "count."

It is an object of this invention to provide a counting mechanism which will operate on the principle of a direct gear driven counter when operating at high speeds and will not, therefore, be subjected to destructive influences.

It is another object of this invention to provide a counting mechanism for operation at high speeds which, as it slows down near the end of the count, operates on a "carry-over" basis.

It is still another object of this invention to provide a high speed counting mechanism which will incorporate the desirable features of both direct, gear driven counter mechanisms and cam driven "carry-over" mechanisms.

A further object of this invention is to provide a high speed counting mechanism which will exhibit figures visible from either side of the device and will carry type for printing the amounts counted.

A still further object of this invention is to provide a counting mechanism which will operate at a sufficiently high speed to serve as the indicator of weight being weighed upon an automatic weighing scale and which, when approaching a balance point or when such point has been reached, will centrally position the figures borne by the counting dials for indicating and printing purposes.

More specific objects and advantages are apparent from the description, in which reference is had to the accompanying drawings illustrating preferred forms of counting mechanisms embodying the invention.

In the drawings:

Fig. I is a view in elevation, certain parts being broken away, of a counting mechanism embodying the invention.

Fig. II is a vertical sectional view, taken on the line II—II of Fig. I.

Fig. III is a fragmentary sectional view, taken on the line III—III of Fig. I.

Fig. IV is a fragmentary view, taken substantially from the position indicated by the line IV—IV of Fig. I.

Fig. V is a plan view of the mechanism shown in Fig. I.

Fig. VI is a view, in elevation, showing that side of the mechanism opposite from the side shown in Fig. I.

Fig. VII is a fragmentary view, taken from the position indicated by the line VII—VII of Fig. II.

Fig. VIII is a fragmentary detailed view, taken from the line VIII—VIII of Fig. VII.

Fig. IX is a projection on the plane of the paper of the digits carried on the peripheries of the drums of the counting mechanism disclosed in Figs. I through VIII.

Fig. X is an end view, in elevation, of a counting mechanism embodying a modification of the invention.

Fig. XI is a fragmentary view, in elevation, taken substantially from the position indicated by the line XI—XI of Fig. X.

Fig. XII is an enlarged vertical sectional view, taken substantially on the line XII—XII of Fig. X.

Fig. XIII is a horizontal sectional view, taken substantially on the line XIII—XIII of Fig. XII.

Fig. XIV is a vertical sectional view, taken substantially on the line XIV—XIV of Fig. XII.

Fig. XV is a fragmentary view, in elevation, taken substantially from the position indicated by the line XV—XV of Fig. XIV.

Fig. XVI is a fragmentary sectional view, taken on the line XVI—XVI of Fig. XIV.

Fig. XVII is a fragmentary view, in elevation, taken from the position indicated by the line XVII—XVII of Fig. XV.

These specific drawings and the specific description that follows merely disclose and illustrate the invention and are not intended to impose limitations upon the claims.

A power input shaft 10 (Figs. I and III) is driven by the output of any device with which the counting mechanism embodying the invention is adapted to be employed. This shaft 10 may be driven, for example, by the output shaft of a follower mechanism which "follows" a weighing scale indicator, or it may be driven by the output shaft of calculating mechanism interposed between such follower mechanism and the counting mechanism. Or, it may be driven by an output shaft of sensing mechanism which operates to sense the position of the weighing scale mechanism after the scale has come to rest. Since follower, calculating and sensing mechanisms do not constitute a part of the instant invention, and since their operation is well known in the art, they are not described herein.

The input shaft 10 is journaled in a bearing 11 riveted through a triangular frame member 12 which, with a similar frame 13, forms the main frame of the device. The frame members 12 and 13 are welded to a pair of hollow cross frame members 14 which may be mounted for support upon a pair of rods 15. The input shaft 10 is also journaled in a bearing 16 similarly riveted through a subsidiary frame member 17, which is welded to the hollow frame members 14 extending parallel to, and lying between, the frame members 12 and 13.

A pinion 18 is pinned on the shaft 10 and is in mesh with a gear 19, which is riveted to the hub of a pinion 20 fixed on a shaft 21 by means of a set screw 22. The shaft 21 is journaled in two bearings 23, one of which is set in the apex of each of the triangular frame members 12 and 13. The shaft 21 is horizontal and parallel to the rods 15 on which the counting mechanism is supported.

A tens and units digits drum 24, the periphery of which, in the embodiment disclosed, carries indicia for the tens and units digits, has a single web 25 constructed integrally with the periphery of the drum and riveted to a hub 26 which is fixed to the shaft 21 by a set screw 27. The gearing from the instrument follower mechanism to the center shaft 21 through the shaft 10, pinion 18 and gear 19 is such that the shaft 10 makes one rotation for each count of 100 and the center shaft 21 makes one rotation for each count of 500. The full capacity of this embodiment of the invention is 9995 by increments of 5.

A pair of T shaped brackets 28 and 29 (Figs. I, II, V and VI) is pivotally mounted on the shaft 21 which extends through holes near the lower end of the vertical stems of the T's. The cross arms of the T's of the brackets 28 and 29 are connected by a pair of parallel tubes 30 and 31 which are located at the ends thereof and are parallel to the tubular frame members 14 and the center shaft 21. The two T shaped members 28 and 29, and the connecting tubes 30 and 31, form a rocker frame rockably mounted on the shaft 21.

The pinion 20 is in mesh with both parts of a two-part anti-backlash gear 32, which consists of two identical gear parts one of which is riveted to a hub 33 journaled on a pin 34 supported by the T frame 28, and a Y bracket 35 depending from the tubes 30 and 31. The other thin gear part of the anti-backlash gear is freely rotatable on the hub 33, and three interposed springs 38 exert pressure to urge the teeth of the two identical gear parts 36 and 37 slightly offset and hence to enter the teeth of the pinion 20 without any backlash.

A pinion 39 is secured on the hub 33 and is in mesh with an idler gear 40, which is journaled between the Y bracket 35 and a similar bracket 41 also secured to the tubes 30 and 31. The idler gear 40 is in mesh with a drive gear 42 which is secured upon a countershaft 43 journaled in the T shaped brackets 28 and 29 equidistantly between and parallel to the tubes 30 and 31. Also pinned upon the shaft 43 are two pinions 44 and 45. The pinion 44 is in mesh with a large annular driven gear 46 which is adjustably fastened to the web of a hundreds drum 47, the hub of which is journaled on the main shaft 21 and the periphery of which bears indicia for printing and indicating the hundreds increments of value or weight. The diameter of the drum 47 is equal to the diameter of the drum 24.

The pinion 45 is in mesh with a second annular driven gear 48 which is adjustably fastened to the web of a second hundreds drum 49 located on the other side of the drum 24 from the hundreds drum 47 and equal in diameter to these two drums.

The gear ratio between the center shaft 21 and the top pinion shaft 43 is 2:1 and the ratio between the pinions 44 and 45 and the annular driven gears 46 and 48 respectively is 10:1, resulting in a ratio of 20:1 between the center tens and units drum and the two outer hundreds drums 47 and 49. This ratio is established by the ratio between the smallest increments countable on the two outer drums and the inner drum, in this case, 100:5 or 20:1. If the drum fixed upon the shaft 21 were marked with units digits and the drum turned by the gearing were marked by tens digits, the gear wheels would be made of such sizes as to turn the tens drum once for ten revolutions of the units drum.

An actuating arm 50 (Figs. II and VII) is mounted for rocking motion on a pin 51 which is secured in a cross bar 52 extending from one of the tubular frame members 14 to the other between the edges of the drums 24 and 49. The lower end of the actuating arm 50 has two legs through both of which the pin 51 passes. The upper end of the actuating arm 50 is bifurcated, the two arms of the bifurcation both lying in the plane of movement of the actuating arm which plane passes between the drums 24 and 49 and is at right angles to the main shaft 21. The bifurcated upper end of the actuating arm extends around the tube 30 of the rockable frame formed by the T brackets 28 and 29 and tubes 30 and 31.

A five-step cam 53 (Figs. II and VII) is secured by means of cap screws to the hub 26 of the center drum 24 and located in the same plane as the upper end of the arm 50. The periphery of the cam 53 is engaged by a roller 54 journaled in a clip 55 (see also Fig. VIII) which is rockable on a pin 56 extending between the lower legs of the actuating arm 50 and which clip is urged to swing the roller 54 toward the edge of the cam 53 by a spring 57 engaged between the clip 55 and a second pin 58 extending through the legs of the actuating arm 50, the second pin 58 also serving as a stop to limit the movement of the clip under the influence of the spring.

The entire rockable frame, made up of the T shaped frame members 28 and 29 and the tubes 30 and 31, is urged to the left in Fig. VI, by a spring 59, one end of which is engaged with the T shaped bracket 29 and the other end of which is hooked to an arm 60 adjustably mounted on the triangular end frame 13. The tension of the spring 59 holds the roller 54 in engagement with the periphery of the cam 53 by means of the connection between the frame and the yoked end of the actuating arm 50.

Although the quantity of individual numbers which can be printed around the periphery of the counting drums can be increased by making the drums larger, or the figures smaller, the former may be undesirable for reasons of space and the latter for reasons of legibility. A counter of convenient size will accommodate one hundred good sized legible figures on its drum. The device illustrated is designed to have a maximum capacity of 9,999 which can be achieved with only two rows of figures on the hundreds drums, i. e., "0" to "99." The figures borne by the center or tens and units drum, depend upon the smallest increment which it is desired to count. This smallest increment may be one, in which case the center drum would bear indicia in series such as "0, 1, 2, 3," etc., to "99," it may be two, in which case the center drum would bear indicia from "0, 2, 4, 6," etc., to "98," or other increments may be used.

In this embodiment of the invention the counting mechanism is constructed to count from zero to ten thousand in increments of five. Fig. IX is a projection on the plane of the paper of the indicia borne by the drums showing the relations of the various series. The tens and units drum 24 carries a plurality of series of indicia each reading "5," "10," "15," etc., to "95." The tens and units drum 24 has two sets of five series each of identical indicia. One of these sets is upright in Figs. IV and IX and consists of the first two columns of figures on the left side of the drum 24 which are designated by the reference numerals 61. The second set of five series of indicia, designated by the reference number 62, is inverted in Figs. IV and IX and is designed to be read from the opposite side of the counting mechanism. The drum 24 also carries five series of type, indicated by the numeral 63, which are raised from the surfaces of the drum for printing the indication shown by the sets of visible indicia 61 and 62. The two hundreds drums 47 and 49 each carry a series of hundreds indicia from zero to one hundred, the drum 49 bearing a series of indicia 64 legible from the same side of the mechanism as the indicia 61 on the drum 24, and the drum 47 bearing a series of indicia 65 associated with the indicia 62 on the drum 24 and a series of printing type 66 associated with the type 63 on the drum 24.

If the mechanism were designed to count in increments of one, the center or tens and units drum would bear two sets each consisting of a single series of indicia from "0" to "99" by one, and one series of type corresponding thereto. If two were the smallest increment, the inner drum would bear two sets of indicia each consisting of two series from "0" to "98" by two.

When employed with calculating mechanism, the indicia carried by the drums would be arranged to read in monetary values.

When the input shaft 10 is rotated, (in a clockwise direction in Fig. I for example) the center shaft 21 to which it is geared turns and the tens and units drum 24 are turned in a counterclockwise direction, or in the direction of the arrows shown on such drum in Figs. IV and V.

As the input shaft rotates it drives the center shaft 21 and drum 24, as described, and, through the pinion 20, the split gear 32, the pinion 39, the idler gear 40 and the drive gear 42, the driven shaft 43 and driving pinions 44 and 45. The pinions 44 and 45 rotate in a clockwise direction (Fig. I) and drive the two annular driven gears 46 and 48, and the two hundreds drums 47 and 49 respectively, in the same direction as the drum 24 is rotated.

The rotation of the drum 24 also rotates the cam 53 which is bolted to it (in the direction of the arrow shown in Fig. VII) and when the mechanism is operating at low speed the roller 54 is engaged with the periphery of the cam. The tension created by the spring 59 pulls the actuating arm and rockable frame to the left with the roller 54 following the declining face of the cam. In Fig. VII the roller 54 is shown engaged with a gently sloping surface 67 on the periphery of the cam 53. The length of this section 67 on the periphery of the cam bears a ratio to the length of an adjoining steep section 68 equal to the ratio between the increments measurable on the hundreds drums 49 and 47 and the increments measurable on the tens and units drum 24 less one (that is, in the embodiment shown, twenty of the increments measurable by the drum 24 are required to equal one of the increments measurable on the hundreds drums 47 and 49 and the ratio of length between the surfaces 67 and 68 is 19:1). During 19/20 of the one-fifth rotation of the cam 53, represented by the distance from the start of one of the surfaces 67 to the start of another, the arm 50 gradually swings to the left in Fig. VII. Since the driven pinion 44 is rotating in a counterclockwise direction in Fig. VII, and turning the annular driven gear 46 in a clockwise direction, by moving the pinion 44 bodily to the left, it is "backed up" on the driven gear 46 as it tends to move the gear forward. The gradual fall in the surface 67 of the cam 53 is such that the movement of the pinion 44 to the left exactly compensates for the rotation of the driven gear 46 to the right which would otherwise result from the rotation of the pinion 44 and, therefore, the gear 46 and the drum 47, to which it is attached, remain stationary during this first 19/20 of the distance through which the cam 53 moves to represent one increment on the hundreds drums 47 and 49.

There are five sets of surfaces 67 and 68 on the cam 53, one for each individual series of the sets of indicia 61 and 62 from "0" to "95." The tens and units drum, having five series of indicia each of which represents the difference between two successive indicia on the hundreds drums, turns through one-fifth of one revolution for each advance of the hundreds drums.

The number of steps, comprising the two surfaces 67 and 68, in the cam varies in accordance with the ratio between the smallest increment on the inner drum and the smallest increment (one hundred) on the outer drums. If, as mentioned above, the center drum carries indicia from "0" to "99" by one, the cam 53 would have only one step and the surface 67 would extend through 99/100 of the circumference of the cam, the surface 68 extending through the remaining 1/100. In addition to the changes in the indicia borne by the inner drum and the steps on the cam, the gearing between the inner and outer drum would have an overall ratio of 100:1 rather than 10:1. This would also apply to a monetary counter. For increments of two, the cam 53 would have two steps, each extending through one-half of the cam circumference and comprising a surface 67 49/100 long and a surface 68 1/100 long; or 49/50 and 1/50 of the step only. In the former case a complete revolution of the inner drum would take place before the outer drums changed and in the latter one-half a revolution.

When the roller 54 hits the steep section 68 of the cam 53, the actuating arm 50 is snapped to the right (Fig. VII) which pulls the rockable frame to the right and, since this movement is much faster than the rotation of the gear 46 which results from rotation of the drive pinion 44, the gear 46 is moved in a clockwise direction the distance between successive ones of the indicia borne by the drum 47. Thus, when the device is operating slowly the drum 24 moves steadily and the hundreds drum 47 and 49 are moved intermittently from position to position by the action of the cam and actuating arm.

When the device is operating at high speed as it needs must when the instrument to which it is attached, for instance a weighing scale, is moving rapidly, the increased speed of rotation of the cam 53 is so high that there is insufficient time for the spring 59 to overcome the inertia of the T shaped frame members and the parts movable therewith and act through the actuating arm 50 to swing the T shaped frame members and connected parts to the left as each of the surfaces 67 of the cam 53 passes the roller. During such high speed operation the actuating bar and the rockable frame move to the limit of their travel to the right and are held in that position by the repeated passage of the high points of the cam against the roller 54. To assist in holding the actuating arm 50 to the right and to prevent the arm from moving to the left fast enough so that the roller 54 will follow or partially follow the surface of the cam 53 and be subjected to destructive blows from the surfaces 68 thereof, an air dashpot 69 is connected between the frame of the counting mechanism and the T shaped member 29 of the rockable frame. The air dashpot 69 comprises a plunger 70, secured on a rod 71 which is pivotally attached to the T shaped member 29, and a thimble 72 in which the plunger 70 is located, which is secured to a bracket 73 bolted to the end frame member 13 of the counting mechanism. The air dashpot 69 acts as a damper on the rocking motion of the rockable frame and does not permit it to move to the left between the steep sections of the cam.

To further ease the effect of the repeated passage of the high points of the cam 53, the roller, as described, is resiliently mounted in the actuating arm 50 and being light in weight can yield quickly with the passage of each high point of the cam without causing the actuating arm and rockable frame to oscillate. The rockable frame thus remains at one side of its range of movement while the counting mechanism operates as a direct gear driven mechanism with all of the drums moving continuously.

As the device to which the counter is attached approaches the end of its count (as for example when a weighing scale approaches balance under a load thereon), its operation slows down and the counting device is moved slowly enough so that the oscillation of the rockable frame takes place at a slow enough speed not to be damped by the air dashpot 69 and the hundreds wheels are moved from position to position as above described. When the instrument to which the counter is attached returns toward zero (for example when a load is removed from a weighing scale) the shaft 10 is rotated in a reverse direction which rotates the various portions of the counting mechanism in the direction opposite to that described above. However, when operating at high speed or low speed, or in one direction or the other, the counting mechanism operates in the same manner, i. e., while returning toward zero at high speed it operates as a direct drive counting mechanism and at slow speed it operates as a cam type carry-over mechanism.

Two viewing screen brackets 74 and 75 (Fig. IV) are bolted to the end frame member 13 and carry two viewing screens 76 and 77 which extend across above the surface of the counting drums. In each of the viewing screens 76 or 77 there are four apertures 78 which are located above the series of indicia on the drums which are legible from that side of the device on which the screen is located.

In Fig. IX the viewing apertures in the screens 76 and 77 are shown in dotted lines and designated by the words "Front" and "Back" respectively. The counting mechanism has been designed so that the series of type 66 and 63, borne by the drums 27 and 44 respectively, can be printed on impression-receiving media located beneath the counting mechanism. The impression-taking mechanism, since it does not constitute part of the instant invention, is not herein disclosed. The position at which the type to be printed are located when printing takes place is shown in Fig. IX and indicated by the word "Print."

The embodiment of the invention which is disclosed in Figs. X through XVII operates according to the same principles as the embodiment already described but is provided with four separate digit bearing drums, one each for units, tens, hundreds and thousands.

The main frame of the counting mechanism comprises two end plates 78 and 79 which are assembled by means of two parallel tubes 80 and two parallel rods 81. The tubes 80 are each located at one of the lower corners of the plates 78 and 79 and are welded thereto. A pair of rods 82 may be inserted through the tubes 80 for mounting the counting mechanism. The rods 81 are each located in one of the upper corners of the plates 78 and 79 and are secured to these plates by means of oval-headed machine screws 83 which extend through holes in the plates 78 and 79, and are threaded into the ends of the rods 81.

An input shaft 84 is journaled in a pair of bearings 85 which are staked in holes bored in the plate 78 and in a triangularly-shaped plate 86, which, with two similar plates 87 and 88, is welded to the tubes 80 parallel to and between the plates 78 and 79. A pinion 89 is secured on the shaft 84 between the plates 78 and 86, its elongated hub 90 serving as a bushing to prevent axial movement of the shaft 84. The pinion 89 is in mesh with a gear 91 which is one of a pair of integral gears 91 and 92 rotatably journaled on a shouldered stud 93 extending through the plate 78 and held thereon by a nut 94. The smaller gear 92 of the integral pair of gears is meshed with a gear 95 which is assembled to a pinion 96 journaled on a shaft 97. The shaft 97 is mounted in the apices of the triangular plates 86, 87 and 88 extending parallelly to the tubes 80 and rods 81 through the plates 79 and 78, being held in place by a nut 98 secured on its end. The pinion 96 is in turn in mesh with an idler gear 99 which is rotatably journaled by means of a shouldered bushing 100 on a second shaft 101 extending parallel to, and above, the shaft 97 between the plates 79 and 78, being stationarily secured to the plate 78 by means of a nut 102. The idler gear 99 is in turn meshed with a small driven gear 103 of the same number of teeth as the pinion 96 and journaled on a third shaft 104 which is mounted at the top center of the plates 78 and 79 parallel to the shaft 97 and 101 and held against rotation by a nut 105. The gear 103 has an elongated hub 106 on which is mounted a units drum 107. The gear 103 and drum 107 are spaced from the plate 78 by a bushing 108.

The gear ratio between the pinion 89 and gear 91 (in the embodiment disclosed) is 1:2½. The ratio between the gears 92 and 95 is 1:2. Thus the ratio between the input shaft 84 and the units drum 107 is 5:1 so that each rotation of the input shaft 84 rotates the units drum 107 a distance equal to two unit increments of value.

A gear 109 is also in mesh with the pinion 96 and is pinned on a jackshaft 110 which is rotatably journaled parallel to the shaft 97 in the two arms of a U shaped frame 111 rockably mounted at the ends of its arms on the shaft 97. A pinion 112 is also pinned on the shaft 110, being meshed with a tens drive gear 113 secured to a pinion 114, both of which are journaled on the shaft 97.

A tens idler gear 115 is mounted on a spacing bushing 116 journaled on the shaft 101 and is in mesh with a pinion 117, journaled on the shaft 104, on which is secured a tens drum 118. The ratio between the pinion 96 and gear 109 is 1:5, and the ratio between the pinion 112 and tens drive gear 113 is 1:2. Thus the total ratio between the pinions 96 and 114 is 1:10, and the ratio between the units drum 107 and tens drum 118 is 1:10.

A gear 119, substantially identical to the gear 109, is pinned on a hundreds jackshaft 120 which is rotatably journaled in the arms of a U shaped frame 121 substantially identical with the frame 111 but extending from the shaft 97, on which it is rockably mounted, in a direction opposite to the direction in which the frame 111 extends. A pinion 122 is also pinned on the jackshaft 120, being in mesh with a hundreds drive gear 123 rotatably journaled with a pinion 124 on the main shaft 97.

An idler gear 125 is rotatably journaled by a spacing bushing 126 on the shaft 101 and meshed with a pinion 127 which rotatably mounts a hundreds drum 128 on the shaft 104. The gear ratio between the pinions 114 and 124, and thus between the drums 118 and 128 is 1:10 in accordance with the ratio between the tens values and hundreds values.

A gear 129, also in mesh with the pinion 124, is pinned on a thousands jackshaft 130 which, similarly to the jackshafts 110 and 120, is journaled in the two arms of a rockable U shaped frame 131 which extends in the same direction from the shaft 97, on which it is mounted, as the frame 111. A pinion 132 is also pinned on the jackshaft 130 and is in mesh with a thousands drive gear 133 which, with its associated pinion 134, is journaled on the shaft 97 between the arms of the frame 131. A thousands idler gear 135 is in mesh with the pinion 134 and is rotatably journaled by a bushing 136 on the shaft 101. The gear 135 drives a pinion 137 by which a thousands drum 138 is rotatably journaled on the uppermost shaft 104. The gear ratio between the drums 128 and 138, and their respective pinions 124 and 134, is 1:10 corresponding to the ratio between hundreds and thousands.

The pinions 96, 114 and 124, in addition to mounting the gears 95, 113 and 123 respectively, also mount three cams 139, 140 and 141 (see also Fig. XIV). The periphery of each of the cams 139, 140 and 141 has a long slowly rising surface 142 which extends through nine-tenths of the circumferential distance around the cam, and a short abrupt surface 143 which extends through the remaining one-tenth of the distance. The peripheries of the cams 139, 140 and 141 are each engageable by a ball bearing roller 144 journaled in one of three bifurcated rocker arms 145, 146 and 147 respectively. The rocker arms 145, 146 and 147 are each mounted on one of three studs 148 (Fig. XVI) which are riveted to the triangular plates 86, 87 and 88 respectively.

Through the outermost end of the rocker arm 145 there is threaded a shouldered pin 149, the two shoulders of which extend through the two longer arms of a double L shaped connection member 150 (Fig. XV). The upper end of the connection member 150 is similarly connected by means of a shouldered pin 151 to an ear 152, formed in, and extending rearwardly from, the cross arm of the rockable frame 111. The apertures in the connection member 150, through which the pin 149 extends, are in the form of vertically elongated slots 153 (Fig. XVII).

A small coil spring 154 is engaged between the ends of the pins 149 and 151, thus tending to hold the pin 149 at the top of the slots 153. A weaker coil spring 155 is engaged between the outermost one of the short arms of the connection member 150 (Fig. XV) and a flattened pierced ear 156 on a stud 157 extending through one of the rods 81. The spring 155 urges the rocker arm 145 upwardly, tending to hold its roller 144 in contact with the periphery of the cam 139. Thus, the spring 154 normally keeps the pin 149 at the top of the slots 153, holding the arm 145 and rockable frame 111 operatively together so that the movement of the rockable arm 145, caused by its roller running on the periphery of the cam 139, is participated in by the rockable frame 111.

The counting mechanism is connected to the device with which it is employed so that when the device is accumulating value, i. e., when the value being measured thereby is increasing the input shaft 84 is rotated in a counterclockwise direction (Fig. XIV). This movement, through the intermediate gears 91 and 92, rotates the gear 95, pinion 96 and cam 139 in a counterclockwise direction. The idler gear 99 transmits the counterclockwise rotation of the pinion 96 to the pinion 103 and units drum 107 which also rotate in a counterclockwise direction. The gear 109 and pinion 112 are rotated in a clockwise direction which rotates the gear 113 in a counterclockwise direction. As the cam 139 rotates in a counterclockwise direction, the gradually rising surface 142 slowly moves the rocker arm 145 downwardly, pulling downwardly, through the spring 154, against the bias of the spring 155 and pulling the rockable frame 111 downwardly. Since the pinion 112 is rotating in a clockwise direction, moving it downwardly bodily revolves it around the gear 113 and "backs it up" on the gear which it is driving. Therefore there is no net movement of the gear 113, the rotation of the pinion 112 being compensated for by its bodily movement and during the count of the first nine digits, the gear 113 not being rotated, the tens drum 118, which it ultimately drives, remains stationary.

However, when the cam 139 has turned through nine-tenths of a rotation, and the arm 145 and frame 111 have been moved downwardly (to the position occupied by the arm 146 and frame 121 in Fig. XIV), the spring 155 has been greatly extended and, as the roller 144 moves over the surface 143 of the cam 139, the spring 155 snaps the arm 145 and frame 111 sharply upward. This bodily moves the pinion 112 forward on the gear 113, applying thereto the movement which had been stored by the "backing up" of the pinion 112 during the first nine-tenths of a rotation of the cam 139. This, in turn, sharply rotates the gearing connecting the gear 113 to the tens drum 118 which advances a distance corresponding to a count of one digit thereon or a value of ten.

Because each rotation of the cam 139 causes an oscillation not only of the light arm 145 but also of the heavier frame 111 and the gears mounted therein, when the counting mechanism is operating at high speed there is insufficient time during each rotation of the cam 139 for this oscillation to be completed and provision must be made to prevent the mechanism from destroying itself. It is for this reason that the apertures 153, in which the pin 149 is engaged, are elongated. This permits the arm 145 to oscillate with respect to the frame 111. When the arm 145 is oscillating at high speed, the frame 111 is held stationary so that the spring 154 will not cause it to move along with the arm 145 by an air dashpot 158 bolted to the rod 81, the plunger of which is connected to the connection member 150. The operation at high speed is as follows: The arm 145 is thrust downward rapidly, which originally pulls the frame 111, connection member 150 and plunger of the dashpot 158 downwardly. The arm 145 moves upwardly a short distance as its roller 144 takes off from the high end of the surface 142 and almost at once returns to the limit of its downward movement because the cam 142 is rotating too fast to permit the roller 144 to follow the surface 143. The inertia of the rockable frame 111, plus the damping action of the dashpot 158, suffices to hold these members substantially motionless and the rocker arm 145 vibrates rapidly in the slots 153 without changing the position of the remaining members. The arm is so light in weight that it can thus vibrate without injury. Therefore at high speed, the mechanism connecting the units drum 118 is not affected by the cam 139 and there is a direct 1:10 gear ratio between the two drums.

The rockable arms 146 and 147 operate in conjunction with their cams 140 and 141 and with connection members 159 and 160, the dashpots 161 and 162 respectively, in a manner identical to the above described operation of the arm 145 and its associated parts.

At high speed, the arm 145 is certain to move downwardly and remain there and the arm 146 is quite certain to do so, but it may be that the speed is not high enough to rotate the thousands cam 141 with sufficient rapidity to move the rocker arm 144 downwardly. In that event, the units, tens and hundreds wheels will operate as direct gear driven counter wheels and the thousands wheel will be cam driven. In any event, variations in speed of operation will be automatically compensated for by the separate rockable carry-over mechanisms and their high speed disengaging means to prevent the counting mechanism from destroying itself.

The four counting drums 107, 118, 128 and 138 are located parallel and adjacent at the upper portion of the machine and their peripheries may be viewed through a screen 163 (Figs. XI and XIV) in which are located viewing openings 164, one over each counting drum.

Counting mechanisms having higher capacities may easily be constructed by adding additional groups of digit mechanisms each comprising a rockable frame, the two gears journaled thereby, a rocker arm, an (for example, tens of thousands) increased capacity drum and cam and the associated gears and parts. This mechanism would be incorporated in the counting device in position to be driven from the last pinion 134 in the illustrated gear train.

Operation in reverse is substantially as described with repect to the embodiment disclosed in Figs. I through IX, except for differences in parts, the two modifications of apparatus embodying the invention having identical principles of operation.

Because the counting mechanisms herein described operate at high speed as direct driven mechanisms and at low speed as cam type carry-over mechanisms, they have the advantages of both types of counting mechanisms and the disadvantages of neither. They can be operated at extremely high speeds without destroying themselves, at which speeds it is impossible to read the indicia borne by the counting drums even if they were being moved from position to position. At low speeds, when it is desirable that such indicia be visible, the counters operate as cam type carry-over mechanisms and the hundreds indicia, in the embodiment of Figs. I to IX, or thousands, hundreds and tens indicia, in the embodiment of Figs. X to XVII, are moved from position to position for accurate reading. A counter of this type is particularly advantageous when attached to a weighing scale because it permits the rapid operation necessary to allow the scale to come to rest within a few seconds after a load is applied thereto and yet gives positive indication when the scale has come to rest. Similarly, it is possible to "pour on" material being weighed and, as the desired weight is approached, to pour material on the scale more slowly and thus get a positive accurate indication of the weight, or, if money value calculating mechanism is employed, of the selling price.

The embodiments of the invention that have been disclosed may be modified to meet various requirements.

Having described the invention, I claim:

1. In a counting device, in combination, a major-indicia-bearing member, a divisional-indicia-bearing member bearing at least one series of divisional indicia, a gear train operatively connecting said members, said gear train including a drive pinion meshed with a driven gear, a rockable frame for mounting said pinion for movement around said driven gear while in mesh therewith and a cam driven synchronously with said divisional-indicia-bearing member, resilient means for driving said rockable frame from said cam and limiting the force transmitted from said cam to said frame, said cam having a long sloping surface and a short oppositely directed sloping surface corresponding to each of the series of divisional indicia borne by said divisional-indicia-bearing member, said cam causing said frame to rock and slowly move said pinion about said driven gear in a direction opposite to the direction of rotation of said driven gear when said resilient driving means for said frame engages said long sloping surface on said cam and to sharply move said pinion and rotate said driven gear when said frame engages said short oppositely directed surface on said cam.

2. In a counting device, in combination, a major-indicia-bearing member, a divisional-indicia-bearing member bearing at least one series of divisional indicia, a gear train operatively connecting said members, said gear train including a drive pinion meshed with a driven gear, a rockable frame for mounting said pinion for movement around said driven gear while in mesh therewith, a cam driven synchronously with said divisional-indicia-bearing member, resilient means for driving said rockable frame from said cam and for limiting the force transmitted from said cam to said frame, said cam having a long sloping surface and a short oppositely directed sloping surface corresponding to each of the series of divisional indicia borne by said divisional-indicia-bearing member, said cam causing said frame to rock and slowly move said pinion about said driven gear in a direction opposite to the direction of rotation of said driven gear when said resilient driving means for said frame engages said long sloping surface on said cam and to sharply move said pinion and rotate said driven gear when said frame engages said short oppositely directed surface on said cam, and means for limiting the velocity of said rockable frame during high speed operation of said counting device.

3. A counting device comprising, in combination, a major-indicia-bearing member, a divisional-indicia-bearing member, said divisional-indicia-bearing member bearing at least one series of divisional indicia equal in total to the difference between successive ones of the indicia borne by said major-indicia-bearing member, a gear train operatively connecting said members, said gear train including a pinion meshing with a driven gear for operating said major-indicia-bearing member, a cam driven in synchronism with said divisional-indicia-bearing member, said cam having a long sloping surface and a short oppositely directed sloping surface adjacent thereto for each of the series of divisional indicia borne by said divisional-indicia-bearing member, a rockable frame, said pinion being rotatably journaled in said frame for bodily movement around said driven gear while remaining in mesh therewith, a roller resiliently mounted in said rockable frame and engaging said cam, the relative lengths of adjacent long and short surfaces on said cam being equal in ratio to the relative value of all of a series of divisional indicia from the first to the penultimate indicia and the value of such indicia between the penultimate and ultimate indicia of such series, rocking of said frame under influence of the sloping surface of said cam bodily moving said pinion in a direction opposite to the direction of movement of said driven gear by said pinion if not translated and under influence of the short surface of said cam bodily moving said pinion in the same direction as such movement of said driven gear.

4. In a counting mechanism, in combination, a major-indicia-bearing member, a divisional-indicia-bearing member, said divisional-indicia-bearing member bearing at least one series of divisional indicia equal in total value to the difference between successive ones of the indicia borne by said major-indicia-bearing member, said series of divisional indicia comprising divisional increments of value, a gear train operatively connecting said major-indicia-bearing member and said divisional-indicia-bearing member, said gear train including a driven gear associated with said major-indicia-bearing member and a pinion for driving said gear, a rockable frame, said pinion being journaled in said frame for bodily movement around said driven gear while remaining in mesh therewith, a cam driven in synchronism with said divisional-indicia-bearing member and having a pair of oppositely directed operating surfaces corresponding to each series of indicia borne by said divisional-indicia-bearing member, said rockable frame being in resilient engagement with said cam, whereby movement of said frame in one direction under influence of said cam rolls said pinion around said driven gear in a direction opposite to and a speed equal to the movement of said driven gear resulting from rotation of said pinion during accumulation of value corresponding to the value of a series of indicia borne by said divisional-indicia-bearing member less one increment thereof and movement of said frame in the opposite direction rolls said pinion around said driven gear in the direction of movement of said driven gear during accumulation of value equal to the last increment of such series of indicia borne by said divisional-indicia-bearing member, and means for restraining said rockable frame from following said cam during high speed operation of said counting mechanism.

5. In a counting device, in combination, a rotatable major-indicia-bearing member, a rotatable divisional-indicia-bearing member, said members being mounted adjacent and coaxial, a gear train connecting said members, said gear train including a driven gear connected to said major-indicia-bearing member and mounted concentrically therewith and a driving pinion, in mesh with said driven gear, a rockable frame mounted coaxially with said members for journalling said pinion and when rocked for rolling said pinion around said gear while in mesh therewith, a cam driven in synchronism with said divisional-indicia-bearing member, the indicia borne by said divisional-indicia-bearing member comprising at least one series equal in value to the difference between successive ones of the indicia borne by said major-indicia-bearing member, a roller resiliently mounted on said frame and engaged with said cam, said cam having one set of oppositely directed sloping surfaces for each of such series of indicia borne by said divisional-indicia-bearing member, such sloping surfaces serving to rock said frame and thereby roll said pinion around said gear and means for restraining movement of said frame such that said frame remains near one end of its path of rocking movement with said roller momentarily contacting said cam during high speed operation of said counting device.

6. In a counting device, in combination, a minor-increment-indicia-bearing wheel bearing at least one series of indicia legible from one side of said wheel and bearing a corresponding series of minor-increment-indicia legible from the opposite side of said device, a major-increment-indicia-bearing wheel coaxially journaled with said minor-increment-indicia-bearing wheel and bearing a series of indicia representing increments of value each equal to the total value of a series of indicia borne by said minor-increment-indicia-bearing wheel legible from one side of said device in association with one of the series of indicia borne by said minor-increment-indicia-bearing wheel, a second coaxially journaled major-increment-indicia-bearing wheel bearing indicia corresponding to the indicia borne by the first mentioned major-increment-indicia-bearing wheel and legible from the opposite side of said device in association with the other series of indicia borne by said minor-increment-indicia-bearing wheel, a gear train driven by said minor-increment-indicia-bearing wheel and driving both said major-increment-indicia-bearing wheels in synchronism, said gear train including a driven gear connected to each of said major-increment-indicia-bearing wheels and pinions meshed with each of said gears, a rockable frame for rotatably journalling said pinions and for "backing up" said pinions around said gears in a direction opposite to the direction of rotation of said gears when rocked, a cam driven in synchronism with said minor-increment-indicia-bearing wheel, a lever attached to said rockable frame and having a resilient portion engaged with the surface of said cam, said cam having a set of oppositely directed sloping surfaces for each series of indicia borne by said minor-increment-indicia-bearing wheel for slowly swinging said lever and said rockable frame to "back up" said pinions on said gears during the counting of value represented by the major part of a series of indicia borne by said minor-increment-indicia-bearing wheel and for sharply swinging said lever and said frame to move said pinions forward around said gears when the value counted reaches the total of a series of indicia borne by said minor-increment-indicia-bearing wheel, and means for preventing said lever from following said cam during high speed operation of said device.

7. In a counting mechanism having high- and low-order indicia-bearing members, in combination, a transfer mechanism for indexing said high-order indicia-bearing member in accordance with a count accumulated on the low-order indicia-bearing member, said transfer mechanism comprising a gear train, an oscillatable frame carrying said gear train and a cam rotating with said low-order indicia-bearing member for oscillating said frame, said cam having a sloping portion extending part way which oscillates said frame to cancel the motion transmitted through said gear train, and another sloping portion which oscillates said frame to add to the motion transmitted through said gear train, the slope of said portions allowing said cam to operate in either direction.

8. In a counting mechanism having high- and low-order indicia-bearing members, in combination, a transfer mechanism for indexing said high-order indicia-bearing member in accordance with a count accumulated on the low-order indicia-bearing member, said transfer mechanism comprising a gear train connecting said members, a frame carrying a portion of said gear train, means for oscillating said frame to supplement uniform motion through said gears and thereby produce intermittent motion of said high-order member, said means comprising a cam having oppositely directed sloping surfaces rotating with low-order member, a cam follower resiliently mounted on said frame and riding on said cam and other resilient means urging said frame in such direction as to cause said follower to engage said cam.

9. In a counting device employing indicia-bearing counting wheels and transfer mechanism for advancing a high order wheel according to a count accumulated on a lower order wheel, in combination, a gear train operatively connecting adjacent counting wheels, a frame mounted for rocking oscillation about the axis of the counting wheels, the frame journaling part of the gear train and adapted to oscillate the journaled part of the gear train to produce intermittent movement of the high order counting wheel, a cam rotating in synchronism with the lower order counting wheel, the cam having oppositely directed sloping surfaces adapted to produce to-and-fro motion of the frame, a follower for the cam, and a preloaded spring mounted between and engaging the follower and the frame for transmitting force from the follower to the frame, the spring having sufficient resiliency to permit the frame to remain substantially at rest during high speed operation of the device.

10. In a counting mechanism having high and low-order indicia-bearing members, a transfer mechanism for indexing the high-order member in accordance with a count accumulated on the low-order member, the transfer mechanism comprising, in combination, a gear train connecting the members for driving the high-order member from the low-order member, a frame which supports part of the gear train and which is rockably mounted so that oscillations of the frame tend to produce corresponding oscillations of the high-order member, a cam operating synchronously with the low-order member, a follower which has a preloaded resilient connection with the frame and is movable with the frame, and means for urging the frame in such direction as to cause the follower to engage the cam, with a force insufficient to deflect the preloaded resilient connection between the follower and the frame, the cam being provided with follower-engaging surfaces which have opposite slopes relative to the direction of movement of the follower, one surface being sloped so that the tendency of the cam to cause movement of the high-order member cancels the tendency of the gear train to cause movement of the high-order member, and the other surface being sloped so that the tendency of the cam to cause movement of the high-order member adds to the tendency of the gear train to cause movement of the high-order member thereby moving the high-order member at substantially the same rate as the low-order member.

LAWRENCE S. WILLIAMS.